(12) United States Patent
Tsuzuki

(10) Patent No.: US 12,724,147 B2
(45) Date of Patent: Sep. 1, 2026

(54) LIGHT EMITTING APPARATUS AND OPTICAL APPARATUS

(71) Applicant: CANON KABUSHIKI KAISHA, Tokyo (JP)

(72) Inventor: Masahiko Tsuzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 429 days.

(21) Appl. No.: 17/578,763

(22) Filed: Jan. 19, 2022

(65) Prior Publication Data

US 2022/0137213 A1 May 5, 2022

Related U.S. Application Data

(63) Continuation of application No. PCT/JP2020/044321, filed on Nov. 27, 2020.

(30) Foreign Application Priority Data

Dec. 25, 2019 (JP) ................................ 2019-233853

(51) Int. Cl.
*G01S 17/08* (2006.01)
*G01S 7/481* (2006.01)
(Continued)

(52) U.S. Cl.
CPC ............ *G01S 17/08* (2013.01); *G01S 7/4814* (2013.01); *G02B 7/022* (2013.01); *G02B 7/025* (2013.01); *G02B 19/0047* (2013.01)

(58) Field of Classification Search
CPC ........ G01S 17/08; G01S 7/4814; G01S 17/10; G01S 17/36; G01S 7/4817; G01S 17/42;
(Continued)

(56) References Cited

U.S. PATENT DOCUMENTS

2010/0110270 A1* 5/2010 Sekimoto ............... G02B 7/023 348/340
2011/0051209 A1 3/2011 Yamada
(Continued)

FOREIGN PATENT DOCUMENTS

JP H10256674 A 9/1998
JP 2003219235 A 7/2003
(Continued)

OTHER PUBLICATIONS

English translation of JP-2009181084-A (Year: 2009).*
(Continued)

*Primary Examiner* — Christina A Riddle
(74) *Attorney, Agent, or Firm* — ROSSI, KIMMS & McDOWELL LLP

(57) ABSTRACT

A light emitting apparatus includes a first holder configured to hold a light source, a second holder configured to hold an optical element that condenses light from the light source, and a screw member screwed with a screw portion formed in the second holder and having an axis along a direction of an optical axis of the optical element. The screw member and the first holder respectively have contact surfaces that are along a plane orthogonal to the optical axis and in contact with each other. A recess is formed in at least one of the contact surfaces. An adhesive adhering the screw member and the first holder to each other is disposed in the recess formed in the at least one of the contact surfaces.

10 Claims, 2 Drawing Sheets

(51) Int. Cl.
*G02B 7/02* (2021.01)
*G02B 19/00* (2006.01)

(58) Field of Classification Search
CPC ....... G01S 7/4812; G02B 7/022; G02B 7/025; G02B 19/0009; G02B 19/0047; G02B 26/101; G02B 19/0014; G02B 19/0052
USPC ........................................ 356/3–22, 601–640
See application file for complete search history.

(56) References Cited

U.S. PATENT DOCUMENTS

2018/0235040 A1* 8/2018 Yamanaka .......... H01S 5/02476
2019/0086522 A1 3/2019 Kubota

FOREIGN PATENT DOCUMENTS

JP 2006235539 A * 9/2006
JP 2009181084 A 8/2009
JP 2011047832 A 3/2011
JP 2019052981 A 4/2019

OTHER PUBLICATIONS

English translation of JP-2006235539-A, published Sep. 7, 2006. (Year: 2006).*
English translation of Written Opinion issued in Intl. Appln. No. PCT/JP2020/044321 mailed Feb. 9, 2021, previously cited in IDS filed Jan. 19, 2022.
International Preliminary Report on Patentability issued in Intl. Appln. No. PCT/JP2020/044321 mailed on Jun. 28, 2022. English translation provided.
International Search Report issued in Intl. Appln. No. PCT/JP2020/044321 mailed Feb. 9, 2021. English translation provided.
Written Opinion issued in Intl. Appln. No. PCT/JP2020/044321 mailed Feb. 9, 2021.

* cited by examiner

LIGHT EMITTING APPARATUS AND OPTICAL APPARATUS

CROSS-REFERENCE TO RELATED APPLICATIONS

This application is a Continuation of International Patent Application No. PCT/JP2020/044321, filed Nov. 27, 2020, which claims the benefit of Japanese Patent Application No. 2019-233853, filed Dec. 25, 2019, both of which are hereby incorporated by reference herein in their entirety.

BACKGROUND OF THE INVENTION

Field of the Invention

The present invention relates to a light emitting apparatus and an optical apparatus.

Description of the Related Art

LIDAR (Light Detection And Ranging) has been proposed, which measures a presence or absence of an object and a distance to the object by irradiating light such as a laser beam to an object such as a vehicle and by detecting the reflected light. In a case of where a semiconductor laser is used as a light source of a laser beam, it is necessary to adjust a (beam) shape of the laser beam, and for that purpose, a lens is used as disclosed in Japanese Patent Laid-Open No. 2011-47832. By changing a relative position relationship between the light source and the lens, a divergence angle of the laser beam, that is, a width (size) of the laser beam at a target irradiation position can be adjusted.

In a case of where the light source and the optical element such as the lens are held by separate holders, even if the relative position relationship between the light source and the optical element could be adjusted with high accuracy, if an adhesive is then used to fix both holders, the relative position relationship may be changed due to the shrinkage of the cured adhesive.

SUMMARY OF THE DISCLOSURE

The present invention provides, for example, a light emitting apparatus beneficial in maintaining a relative position relationship between a light source and an optical element.

A light emitting apparatus according to one aspect of the present invention includes a first holder configured to hold a light source, a second holder configured to hold an optical element that condenses light from the light source, and a screw member screwed with a screw portion formed in the second holder and having an axis along a direction of an optical axis of the optical element. The screw member and the first holder respectively have contact surfaces that are along a plane orthogonal to the optical axis and in contact with each other. A recess is formed in at least one of the contact surfaces. An adhesive adhering the screw member and the first holder to each other is disposed in the recess formed in the at least one of the contact surfaces.

An optical apparatus according to another aspect of the present invention includes a light emitting apparatus. The light emitting apparatus includes a first holder configured to hold a light source, a second holder configured to hold an optical element that condenses light from the light source, and a screw member screwed with a screw portion formed in the second holder and having an axis along a direction of an optical axis of the optical element. The screw member and the first holder respectively have contact surfaces that are along a plane orthogonal to the optical axis and in contact with each other. A recess is formed in at least one of the contact surfaces. An adhesive adhering the screw member and the first holder to each other is disposed in the recess formed in the at least one of the contact surfaces.

Further features of the present invention will become apparent from the following description of exemplary embodiments with reference to the attached drawings.

DESCRIPTION OF THE EMBODIMENTS

Figure 1:
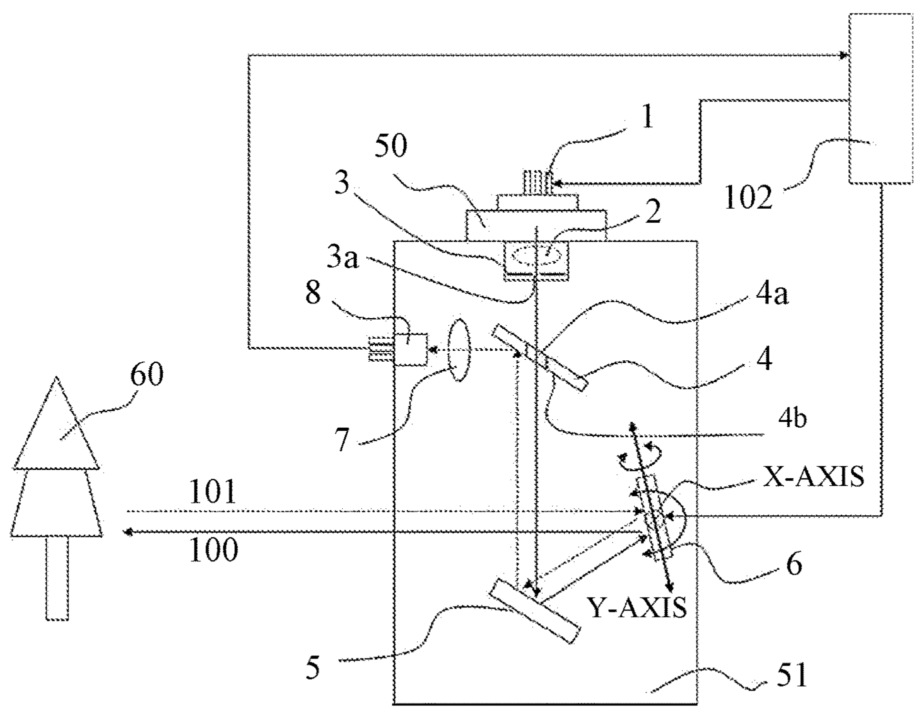
FIG. 1 illustrates a configuration of an optical apparatus according to one embodiment of the present invention.

Referring now to the accompanying drawings, a description will be given of embodiments according to the present invention. FIG. 1 illustrates a configuration of LIDAR as an optical apparatus. LIDAR includes a light emitting apparatus according to one embodiment of the present invention, an irradiation system that irradiates an object with a laser beam emitted from the light emitting apparatus, and a light receiving system that receives reflected light or scattered light from the object.

The LIDAR has a coaxial type in which the irradiation system and the light receiving system face completely the same direction, and a noncoaxial type in which the irradiation system and the light receiving system are separately configured. The LIDAR illustrated in FIG. 1 is the coaxial type, and the optical axes of the irradiation system and the light receiving system are combined by a holed (or perforated) mirror 4.

In FIG. 1, the light projecting apparatus 50 includes a semiconductor laser 1 as a light source that emits a laser beam 100, a condenser lens 2 as an optical element that adjusts a beam shape in a target irradiation area of the laser beam 100, and a fixed diaphragm (aperture stop) 3 that shields unnecessary light included in the laser beam 100.

The laser beam 100 emitted from the semiconductor laser 1 and condensed (converged) by the condenser lens 2 passes through an opening 3*a* in the fixed diaphragm 3, exits from the light projecting apparatus 50, and passes through a hole portion 4*a* in the holed mirror 4 held by a base barrel 51. The laser beam that has passed through the hole portion 4*a* is reflected by a fixed mirror 5 held by the base barrel 51, reflected by a movable mirror 6 held by the base barrel 51, and irradiated to a target irradiation area. The movable mirror 6 includes a MEMS (Micro Electro-Mechanical System) mirror or the like, and is a biaxial drive mirror that is rotated around a Y-axis and an X-axis orthogonal to each other.

Part of the laser beam 100 that is irradiated to the target irradiation area is reflected by an object 60 in the target irradiation area and returns as reflected light 101 to the movable mirror 6. The reflected light 101 that is reflected by the movable mirror 6 is reflected by the fixed mirror 5, reflected by a reflective surface 4*b* of the holed mirror 4, and guided to a condenser lens 7 held by the base barrel 51. The reflected light 101 condensed by the condenser lens 7 is received by a light receiving element 8.

A controller 102 drives each of the semiconductor laser 1 and the movable mirror 6 at a predetermined driving voltage or driving frequency, and measures at a specific frequency an output signal waveform that has been photoelectrically converted by the light receiving element 8. The controller 102 calculates a difference between the time when the laser beam is emitted from the semiconductor laser 1 and the time when the reflected light 101 is received by the light receiving element 8, and calculates (measures) a distance to the object 60 by multiplying the difference by the light speed. Alternatively, the controller 102 may calculate a difference between a phase in which the laser beam is emitted from the semiconductor laser 1 and a phase of the output signal waveform from the light receiving element 8, and calculate the distance to the object 60 by multiplying the difference by the light speed.

Figure 2:
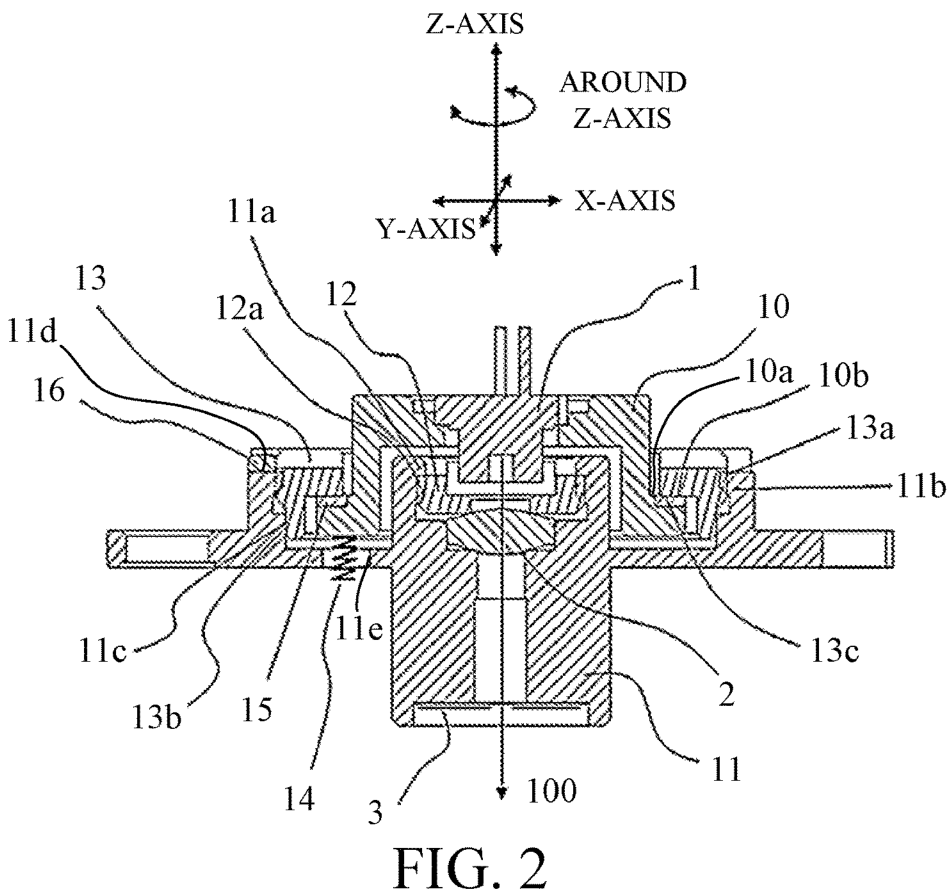
FIG. 2 is a sectional view illustrating a configuration of a light emitting apparatus according to this embodiment.
Figure 3:
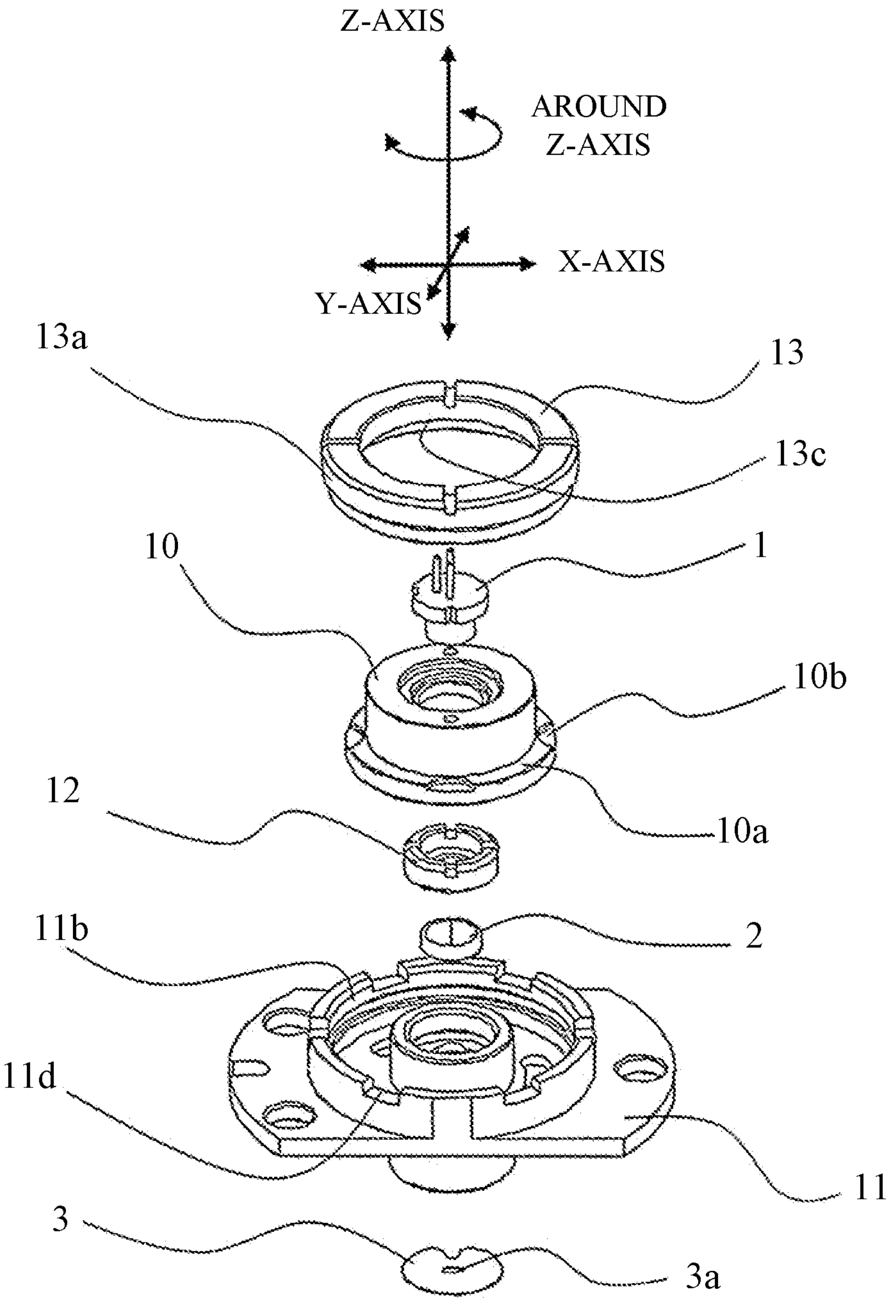
FIG. 3 is an exploded perspective view illustrating the configuration of the light emitting apparatus.

FIG. 2 illustrates a section of the light emitting apparatus 50, and FIG. 3 illustrates the light emitting apparatus 50 in an exploded manner. The semiconductor laser 1 is a light source in which a plurality of light emitting areas are stacked, and emits a plurality of luminous fluxes as the laser beam 100 in a direction in which a diameter of the light emitting area is small. The semiconductor laser 1 is fixed and held by an adhesive on an LD holder (first holder) 10 as described later.

In the light emitting apparatus 50, a Z-axis is set to an optical axis of the condenser lens 2, and a Z-direction (optical axis direction) is set to a direction in which the Z-axis extends. The X-axis and the Y-axis are set to two axes orthogonal to the Z-axis, and an X-direction and a Y-direction are set to directions in which the X-axis and the Y-axis extend, respectively.

The condenser lens 2 is sandwiched in the Z-direction steadily (without rattling) by a lens holder (second holder) 11 and a press ring 12 having a male screw portion 12*a* screwed with a first female screw portion 11*a* of the lens holder 11. Since the beam shape in the target irradiation area of the laser beam 100 significantly affects the performance of LIDAR, a relative position relationship between the semiconductor laser 1 and the condenser lens 2 in the Z-direction, the X-direction, and the Y-direction needs to be adjusted with an accuracy of several μm.

An adjusting ring (screw member) 13 is held by the lens holder 11 because a male screw portion 13*a* of the adjusting ring 13 is screwed with a second female screw portion 11*b* of the lens holder 11 in the Z-direction. The adjusting ring 13 has a flat surface portion 13*c* as a contact surface parallel to the XY plane orthogonal to the Z-axis. The LD holder 10 also has a flat surface portion 10*a* as a contact surface parallel to the XY plane. The LD holder 10 is urged upward in the Z-direction by urging springs 14 as elastic members that are inserted into the hole portions 11*e* formed in the bottom surface portion of the lens holder 11. Thereby, the flat surface portion 10*a* of the LD holder 10 contacts the flat surface portion 13*c* of the adjusting ring 13 in the Z-direction in a pressed state, and unsteadiness (rattling) of the LD holder 10 against the adjusting ring 13 and further the lens holder 11 in the Z-direction is eliminated. Since an outer-diameter fitting portion 13*b* of the adjusting ring 13 fits in an inner-diameter fitting portion 11*c* of the lens holder 11, the adjusting ring 13 and the lens holder 11 and the condenser lens 2 are positioned in the X-direction and the Y-direction.

The relative position relationship (interval) between the semiconductor laser 1 and the condenser lens 2 in the Z-direction can be adjusted by rotating the adjusting ring 13 (male screw portion 13*a*) in a direction around the Z-axis (optical axis direction) relative to the lens holder 11 (female screw portion 11*b*). The adjustment in the Z-direction can adjust the beam shape in the target irradiation area of the laser beam 100 emitted from the semiconductor laser 1 into a predetermined shape.

After the adjustment in the Z-direction, an adhesive 16 as an ultraviolet (UV) curable adhesive or a thermosetting adhesive is disposed in (applied to) adhesive groove portions 11*d* as recesses formed at a plurality of locations (6 locations at intervals of 60° around the Z-axis in this embodiment) above the female screw portion 11*b* in the lens holder 11 in the direction around the Z-axis. When the adhesive 16 is cured, the rotational position of the adjusting ring 13 relative to the lens holder 11, that is, a distance between the semiconductor laser 1 and the condenser lens 2 in the Z-direction is fixed.

The relative position relationship between the semiconductor laser 1 and the condenser lens 2 in the X-direction and Y-direction and the relative position (angle) relationship between them in the direction around the Z-axis are adjusted by moving the LD holder 10 in the X-direction and Y-direction relative to the adjusting ring 13 and the lens holder 11 and by rotating it in the direction around the Z-axis. As described above, the flat surface portion 10*a* of the LD holder 10 is pressed against the flat surface portion 13*c* of the adjusting ring 13 by the urging force of the urging spring 14, and the position of the LD holder 10 relative to the lens holder 11 in the X-direction, the Y-direction, and the direction around the Z-axis can be adjusted while the position of the LD holder 10 relative to the adjusting ring 13 and the lens holder 11 in the Z-direction is maintained. The adjustments in the X-direction, the Y-direction, and the direction around the Z-axis in this way can adjust the position of the laser beam 100, which is emitted from the semiconductor laser 1, into a proper position in the target irradiation area.

A thermosetting adhesive 15 is disposed in (applied to) recesses 10*b* formed at a plurality of locations (four locations at 90° intervals around the Z-axis in this embodiment) in the flat surface portion 10*a* of the LD holder 10. When the thermosetting adhesive 15 is cured in a state where the LD holder 10 is urged in the Z-direction against the adjusting ring 13 by the urging springs 14, the relative positions of the adjusting ring 13 and the lens holder 11, that is, the semiconductor laser 1 and the condenser lens 2 are fixed in the X-direction, the Y-direction, and the direction around the Z-axis.

The thermosetting adhesive 15 shrinks during curing. Since the relative position relationship between the LD holder 10 and the adjusting ring 13 in the Z-direction is determined by the contact between the flat surface portion 10*a* of the LD holder 10 and the flat surface portion 13*c* of the adjusting ring 13 and maintained regardless of whether the thermosetting adhesive 15 is shrinks. Due to the urging forces of the urging springs 14 and the urging force that is caused by the shrinkage of the thermosetting adhesive 15, the friction is generated between the flat surface portion 10*a* of the LD holder 10 and the flat surface portion 13*c* of the adjusting ring 13. This friction can also fix the relative positions in the X-direction, the Y-direction, and the direction around the Z-axis due to the shrinkage of the thermosetting adhesive 15.

The light emitting apparatus 50 that is fixed by adjusting the relative position relationship between the semiconductor laser 1 and the condenser lens 2 as described above is adhered to the base barrel 51 while its positions in the X-direction and the Y-direction are adjusted relative to the base barrel 51 so that the laser beam that is reflected by the movable mirror 6 is irradiated onto the target irradiation area. The relative position relationship between the light emitting apparatus 50 and the base barrel 51 is sufficient as long as it has an adjustment accuracy of several tens of μm.

This embodiment adjusts the relative position relationship between the semiconductor laser 1 and the condenser lens 2 in the Z-direction using the adjusting ring 13 that is screwed with the lens holder 11, and adjusts the relative position relationship in the X-direction, the Y-direction, and the direction around the Z-axis by moving the LD holder 10 relative to the adjusting ring 13 along the flat surface portions 10*a* and 13*c*. In addition, the LD holder 10 and the adjusting ring 13 are adhered to each other by the adhesive 15 that has been disposed in the recesses 10*b* formed in the flat surface portion 10*a* of the LD holder 10. Thereby, even if the adhesive 15 shrinks due to curing, the above relative position relationship can be maintained with high accuracy.

The recesses for disposing the adhesive 15 may be formed on the flat surface portion 13*c* of the adjusting ring 13 or on both the flat surface portions 10*a* and 13*c* of the LD holder 10 and the adjusting ring 13.

This embodiment has discussed a case where the light emitting apparatus 50 is used for the coaxial type LIDAR, but the light emitting apparatus 50 may be used for the noncoaxial type LIDAR, a laser irradiation device other than the LIDAR, and other optical apparatuses.

The present invention can provide, for example, a light emitting apparatus beneficial in maintaining a relative position relationship between a light source and an optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light emitting apparatus comprising:
- a first holder configured to hold a light source and including a first contact surface;
- a second holder configured to hold an optical element that condenses light from the light source, and including:
  - a first screw portion whose axis extends along an optical axis direction of an optical axis of the optical element; and
  - a second screw portion whose axis also extends along the optical axis direction;
- a first screw member configured to be screwed to the first screw portion of the second holder to hold the optical element relative to the second holder; and
- a second screw member screwed to the second screw portion of the second holder to secure the first holder to the second holder, and including a second contact surface,
- wherein the first contact surface includes a first recess located outside the first screw member in a direction perpendicular to the optical axis direction, and
- wherein an adhesive adhering the second screw member and the first holder to each other is disposed in the first recess, and
- wherein the first and second contact surfaces, other than at the first recess, are:
  - in direct contact with each other;
  - extend in the direction perpendicular to the optical axis direction; and
  - confront each other in the optical axis direction.

2. The light emitting apparatus according to claim 1, wherein each of the first and second contact surfaces is a flat plane.

3. The light emitting apparatus according to claim 1, wherein the first recess is in each of a plurality of locations of the first contact surface around the optical axis.

4. The light emitting apparatus according to claim 1, wherein:
- a second recess is included in each of a plurality of locations of the second holder around the optical axis, and
- an adhesive adhering the second screw member and the second holder is disposed in each second recess.

5. An optical apparatus comprising:
- the light emitting apparatus according to claim 1; and
- the optical element, which guides light from the light emitting apparatus to an object,
- wherein the first screw member holds the optical element relative to the second holder.

6. The optical apparatus according to claim 5, further comprising a light receiving element configured to receive light reflected by the object.

7. The light emitting apparatus according to claim 1, wherein the first and second contact surfaces are located between the second screw portion and the first screw portion.

8. The light emitting apparatus according to claim 1 wherein:
- the second screw portion includes a female screw, and
- the second screw member includes a male screw.

9. The light emitting apparatus according to claim 1, wherein the first holder is located closer to the optical axis than the second screw member.

10. The light emitting apparatus according to claim 1, wherein the first recess is located outside the light source in the direction perpendicular to the direction of the optical axis.

* * * * *